US007362724B2

(12) United States Patent
Huang et al.

(10) Patent No.: US 7,362,724 B2
(45) Date of Patent: Apr. 22, 2008

(54) METHOD FOR RIGID BODY DISCOVERY AND PEER-TO-PEER RANGING IN A SCATTERNET AND COMMUNICATIONS NODE

(75) Inventors: Jian Huang, Coral Springs, FL (US); Lance E. Hester, Sunrise, FL (US); Yan Huang, Weston, FL (US); Spyros Kyperountas, Boca Raton, FL (US); Feng Niu, Weston, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 1098 days.

(21) Appl. No.: 10/616,112

(22) Filed: Jul. 9, 2003

(65) Prior Publication Data

US 2005/0007963 A1 Jan. 13, 2005

(51) Int. Cl.
*H04Q 7/00* (2006.01)

(52) U.S. Cl. .................. 370/329; 370/237; 709/220; 709/242

(58) Field of Classification Search ............. 370/328, 370/329, 278, 400, 401, 237, 238, 392, 397; 713/201, 203; 455/434, 41, 41.1; 709/238–242, 709/220–222

See application file for complete search history.

(56) References Cited

U.S. PATENT DOCUMENTS 6,865,371 B2 * 3/2005 Salonidis et al. .......... 455/41.1

6,909,721 B2 * 6/2005 Ekberg et al. .............. 370/401
2003/0224787 A1 * 12/2003 Gandolfo .................... 455/434

OTHER PUBLICATIONS

Gutierrez, J. A.: "IEEE 802.15.4: Developing Standard for Low-Power Low-Cost Wireless Personal Area Networks", IEEE Network, Sep./Oct. 2001, pp. 2-9.
Koushanfar, F.: "Iterative Error-Tolerant Location Discovery in Ad-hoc Wireless Sensor Networks", University of California, Los Angeles, 2001, pp. 1-73.

* cited by examiner

*Primary Examiner*—John Pezzlo (57) ABSTRACT

A method for peer-to-peer ranging and discovery of a rigid body existing in a scatternet having piconets and nodes includes the steps of defining a node (12) in a piconet (10) to be a piconet controller (PNC) having controller functions, locating a rigid body seed including the node (12), and discovering a rigid body by sequentially downloading controller functions of the piconet controller (12) to at least one border node. Also provided is a communications node including a receiver for receiving communications from other communications nodes in a communications range (R), a transmitter for sending communications to other communications nodes in the communications range (R), a memory storing at least ranging information and a unique identification for describing the node, and a processor connected to the receiver, to the transmitter, and to the memory, the processor being programmed to carry out the method according to the present invention.

20 Claims, 4 Drawing Sheets

METHOD FOR RIGID BODY DISCOVERY AND PEER-TO-PEER RANGING IN A SCATTERNET AND COMMUNICATIONS NODE

BACKGROUND OF THE INVENTION

1. Field of the Invention

The invention lies in the field of electronic communications. The invention relates to a method for rigid body discovery and peer-to-peer ranging in a scatternet and a communications node executing the method.

2. Description of the Related Art

Precision location based on the peer-to-peer ranging is one of the fundamental attributes of a sensor network that is capable of delivering position dependent information. Such a ranging technique is limited by how the logical topology is constructed during formation of a network. Specifically, when using a sequentially progressive approach to form a scatternet, a logical structure of a spanning tree forms. Such a configuration prohibits direct communication between some of the members in different piconets, in other words, communication is restricted from nodes that are in physical proximity to one another, but that are not members of the same piconet. Therefore, while the range measurements on the piconets physically exist, logically prohibited links will present a significant challenge to the applicability of location algorithms based on peer-to-peer ranging. Another different aspect of the problem of peer-to-peer ranging lies in an availability of reference nodes in a determination of absolute locations in a scatternet.

A scatternet is a network entity made up of connected piconets. It forms in a spanning tree structure as the result of sequentially attaching new piconet onto existing piconet(s) through special kind of members of previous piconets, these members being defined as a slave piconet controller. Extending communications coverage from a first piconet to a second piconet that is within the range of the first piconet is referred to as a hop. When extending a first piconet to the second, or subsequent, hop using a sequential procedure in a spanning tree structure, the piconet controllers are within range of one another and, therefore, a member node can be converted into a slave piconet controller such that a child piconet is formed and is attached to the parent piconet. In such a case, the entity formed by the connected piconets, or what is referred to as a scatternet, forms the spanning tree structure.

A mesh structure can form if a new piconet is attached to the previous ones through shared member nodes or border nodes located at the overlapping area. When there is no border node available, a mesh can form through edge nodes each located in a respective piconet and within range of one another. Accordingly, a "hop" as it is referred to above, is not a single communications span between two nodes in range of one another. Instead, a hop is defined as the communications link between a first piconet controller, an edge node in range of the first piconet controller, an edge node in range of a second piconet controller, and, finally, the second piconet controller. This case illustrates the formation of a scatternet having a mesh format. A significant concern in such a configuration is the spanning tree type of scatternet. Such a configuration prohibits direct communication between the members in different piconets. Therefore, while the range measurements on these piconets physically exist, logically prohibited links present the aforementioned challenge to the applicability of location algorithms based on peer-to-peer ranging.

The definition of a piconet is a basic unit, sometimes being the smallest component of the network. A piconet has member nodes served by a piconet controller ("PNC"), which also can be referred to as a master node under the Bluetooth standard (IEEE 802.15.1; and which is also referred to as a cell under this standard). The peer-to-peer ranging between PNC and member nodes, and amongst the member nodes themselves, can be scheduled and controlled by the PNC. But ranging between nodes on a different branch or different piconets is prohibited.

SUMMARY OF THE INVENTION

The invention provides a method for rigid body discovery and peer-to-peer ranging in a scatternet that overcomes the hereinafore-mentioned disadvantages of the heretofore-known devices and methods of this general type and that enables execution of peer-to-peer ranging and discovery of a rigid body existing in a scatternet to discover a larger rigid body while maintaining integrity of the scatternet.

Other features that are considered as characteristic for the invention are set forth in the appended claims.

Although the invention is illustrated and described herein as embodied in a method for rigid body discovery and peer-to-peer ranging in a scatternet and a communications node executing the method, it is, nevertheless, not intended to be limited to the details shown because various modifications and structural changes may be made therein without departing from the spirit of the invention and within the scope and range of equivalents of the claims.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DESCRIPTION OF THE PREFERRED EMBODIMENTS

While the specification concludes with claims defining the features of the invention that are regarded as novel, it is believed that the invention will be better understood from a consideration of the following description in conjunction with the drawing figures, in which like reference numerals are carried forward.

The present invention provides a method for enabling execution of peer-to-peer ranging and discovery of a rigid body existing in a scatternet by sequentially downloading the function of a piconet controller to selected border nodes such that a larger rigid body can be discovered. Significantly, at the same time, the method maintains the integrity of the scatternet.

A novel approach for discovering a rigid body is disclosed in a copending U.S. patent application Ser. No. 10/424,178 entitled "Reduced Order Model Location Method for Multi-hop Networks" filed on Apr. 25, 2003, which is hereby incorporated by reference. The method disclosed therein can be applied to increase a probability of locating more nodes than were previously possible using multilateration or progressive reference nodes recruiting schemes. Under the approach disclosed in application Ser. No. 10/424,178, the process of forming a rigid body is conducted starting with a seed, also referred to as a rigid body core, made up of three nodes. Each of these three nodes is in communications range with the other two. According to the method, the rigid body is expanded to include other nodes in the network and, thereby, locate previously unlocatable nodes.

This procedure can be applied to a scatternet made up of piconets by first locating the rigid body core within a piconet. Where the nodes are randomly deployed in each piconet at a constant density, the average network degree G should be sufficiently high to create a network where the piconets each possess the rigid body core. It has been found that a physical network topology sufficient to provide the rigid body core in each piconet forms when nodes with a common transmission range of R are deployed in random locations at a constant density with an average network degree G equal to or larger than 8.

Figure 1:
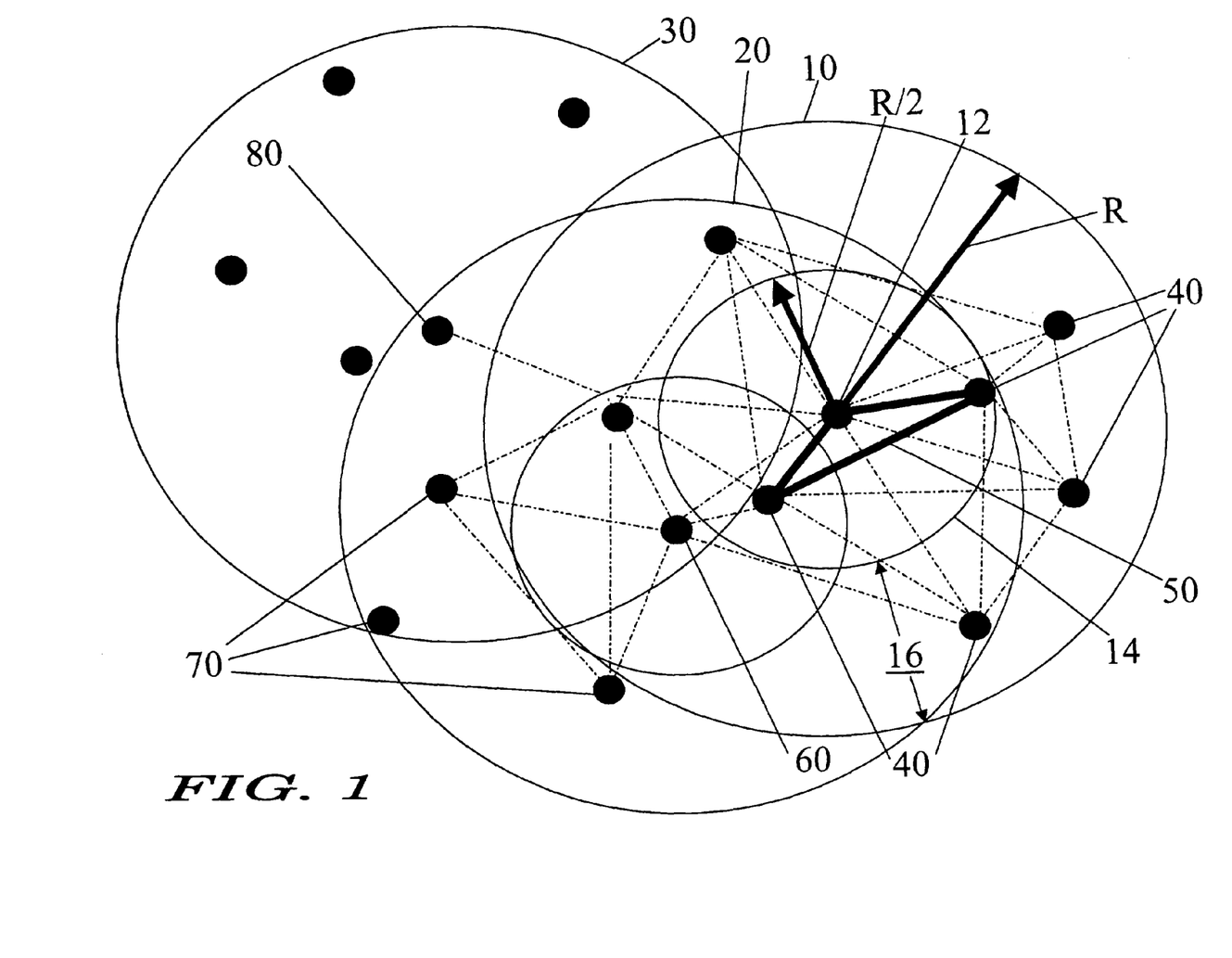
FIG. 1 is a diagrammatic illustration of three overlapping piconets with nodes of a scatternet randomly scattered therein.

FIG. 1 illustrates an example of three overlapping piconets 10, 20, 30 in a scatternet of nodes. A first piconet 10, thus, can be formed centered at a Piconet Controller (PNC) 12 having a communications range equal to R. Considering the ratio of a circular area 14 centered at the PNC 12 and having a radius equal to R/2 to an area 16 of a ring from R/2 to R, a number of the nodes 40 within the circle 14 of radius R/2 should be approximately one-third of the number of the nodes 40 in the ring 16. Specifically, in the example of the first piconet 10, the number of the nodes 40 within the circle 14 of radius R/2 is exactly one-third of the number of the nodes 40 in the ring 16. When there are more than nine nodes 40 in the transmission range R of the PNC 12, it becomes more likely that the three nodes 12, 40 will be present within the circle 14, these three nodes including the PNC 12. From these three nodes 12, 40, a first rigid body 50 can be said to exist and is illustrated by the triangle of heavy lines inside the circle 14.

Based upon the knowledge that the piconet 10 includes a rigid body, the rigid body can be expanded (as set forth in the disclosure of U.S. patent application Ser. No. 10/424,178) to permit peer-to-peer ranging over a larger area than merely the range R of the first piconet 10. The procedure for discovering the rigid body in the scatternet is described in the following text with reference to the flow chart of FIG. 2.

Figure 2:
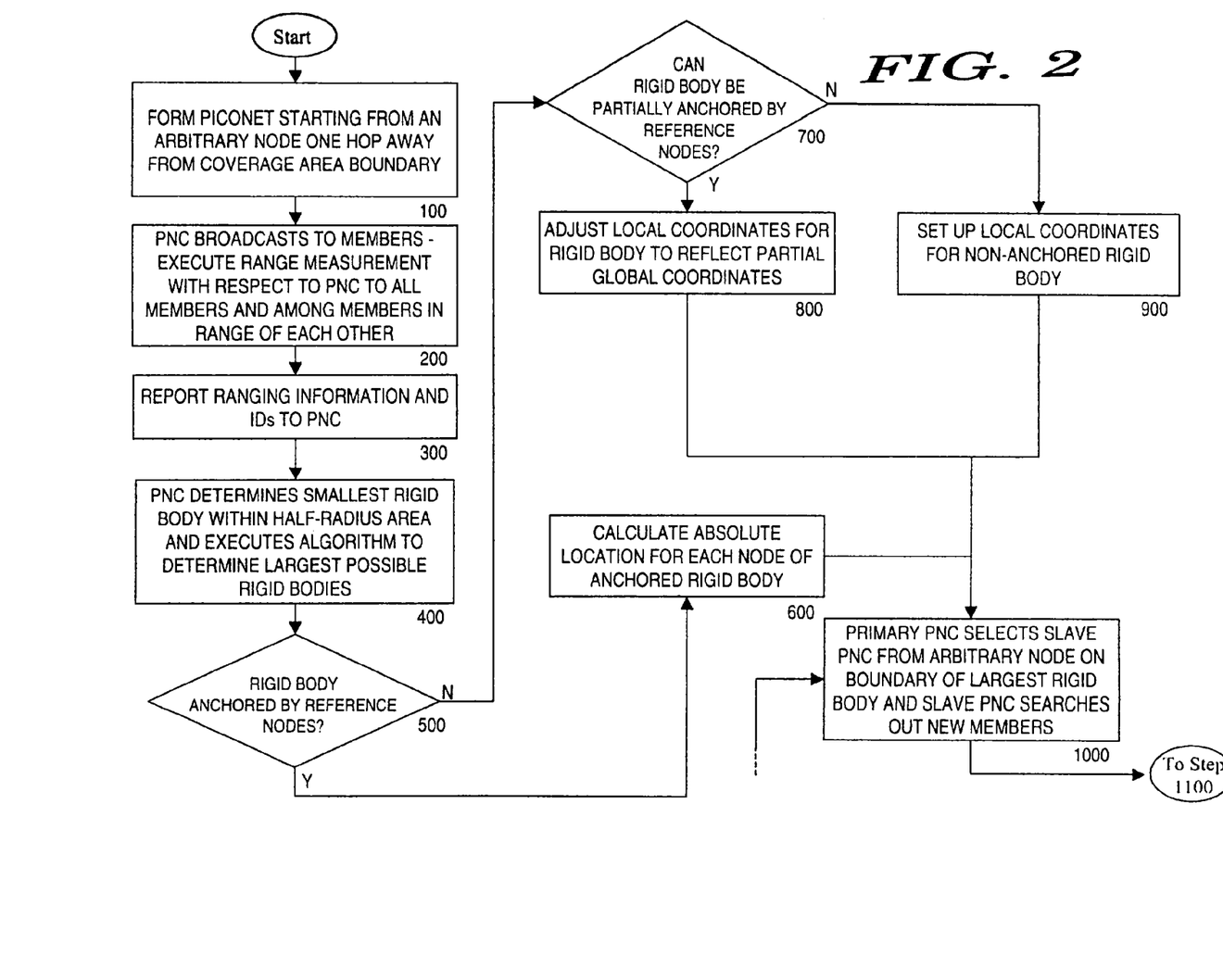
FIG. 2 is a first portion of a flow chart of the method according to the invention.

It is assumed that the network is formed from nodes having an average network degree G equal to or larger than 8. First, in Step 100, a piconet is formed starting from an arbitrary node 12, 40 in the network that is one hop away from a boundary of a coverage area of the network. It is assumed, for the example described below, that the arbitrary node is the PNC 12 and that the piconet 10 starting from PNC node 12 is one hop away from a boundary of a coverage area of the network.

The piconet 10 has a number of members (nodes) equal to or greater than 8, specifically, it has 9. In Step 200, the PNC 12 of the piconet 10 broadcasts to all of its members 40 a command to execute range measurement with respect to the PNC 12 and among all of the reachable peer members 40. Such range measurement can be carried out efficiently according to U.S. patent application Ser. No. 10/454,192 entitled "Distributed MAC Protocol Facilitating Collaborative Ranging in Communications Networks" filed on Jun. 4, 2003, which is hereby incorporated by reference. It is noted that each member 12, 40 has already been assigned, and, therefore, has, a unique identification to distinguish one member 12, 40 from all other members 12, 40. The PNC 12 of the piconet 10 is defined as the Primary PNC. After ranging is complete, in Step 300, the ranging information along with the respective member identifications are reported to the PNC 12 and are stored therein as part of the functionality of the PNC. Based upon the ranging information obtained thereby, in Step 400, the PNC determines a smallest rigid body seed that is a triangle of three members 12, 40 located within the circular area 14 having radius equal to R/2 and then executes the algorithm described in U.S. patent application Ser. No. 10/424,178 to determine the largest number of possible rigid bodies. As set forth in U.S. patent application Ser. No. 10/424,178, more than one rigid body can be present in a multi-hop network. It is assumed, in the execution of the algorithm, that there exists a global connectivity of all of the nodes 12, 40. In other words, each node 12, 40 is able to communicate with at least one other node 12, 40 in the network.

In Step 500, it is determined whether or not available reference nodes anchor a rigid body. If reference nodes anchor a particular rigid body, then, in Step 600, the absolute location is calculated for each node of each anchored rigid body. For the non-anchored rigid body(ies), in Step 700, it is determined whether or not a particular rigid body can be partially anchored. If the rigid body can be partially anchored (for example, 1 or 2 anchors are available in the rigid body), then, in Step 800, the local coordinates for that rigid body are adjusted accordingly to reflect partial global coordinates. Specifically, if one anchor is available on a rigid body, the local coordinates will be shifted according to the location information of the one anchor. If a second anchor is available on a rigid body, the local coordinates of the rigid body will be rotated accordingly. (For additional information regarding anchors, reference is made to U.S. patent application Ser. No. 10/424,178.) If reference nodes do not anchor a particular rigid body, then, in Step 900, local coordinates are set up for the non-anchored rigid body.

Figure 3:
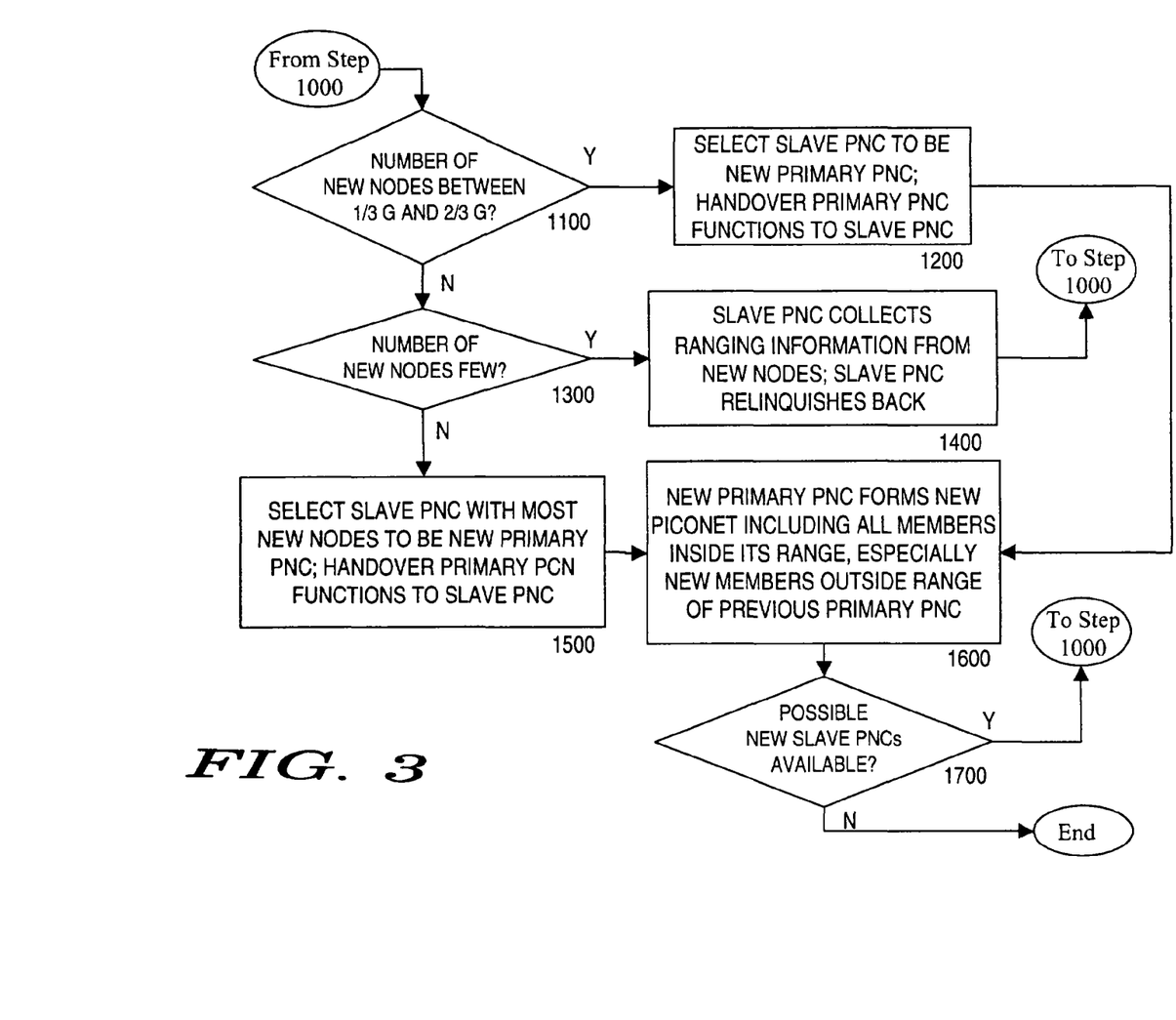
FIG. 3 is a second portion of the flow chart of FIG. 2.

In Step 1000, an arbitrary node on the boundary of the largest rigid body is selected to be a Slave PNC. This arbitrary node broadcasts communications for searching out node members of the Slave PNC. The probability of finding new nodes not already included in the original piconet is proportional to the non-overlapping area of a given piconet, which is, at most, about 60% of the area of that piconet. Accordingly, the number of new nodes that can be found is less than two-thirds of the network degree G, which is $\geq 8$ in the exemplary embodiment. There are several scenarios to be considered when searching out new members:

(1) if the number of new nodes found by the Slave PNC is between ⅓ G to ⅔ G (Step 1100; see FIG. 3):
   in Step 1200, the Slave PNC will be selected as the "most eligible" for being handed over the Primary PNC function, and the Primary PNC will handover its function to the Slave PNC (which will download such functionality);

(2) when the number of new nodes found by the Slave PNC are few (e.g., 1 or 2) (Step 1300):
   it is assumed that a node at the boundary of the biggest rigid body will be near the boundary of its respective piconet (which is true with high probability because the probability of finding nodes in the ring area 16 between R/2 to R is three times the probability of finding nodes in the circular area 14 of R/2. If nodes are found attached to the rigid body seed, it is likely that the boundary of the rigid body is near the boundary of the piconet.). Because the number of new nodes found is few, the Slave PNC is permitted, in Step 1400, to only collect the ranging information from those new nodes and among those new nodes. Thereafter, the node that is the Slave PNC will relinquish its Slave PNC status and the Primary PNC will assign another arbitrary available node on the boundary of the rigid body as the Slave PNC. This searching procedure repeats until a new Slave PNC is found—meaning that it is a member node able to accept the role of a new Primary PNC and it has a relative balanced number of nodes in its coverage area and new members therein (preferably, to be between ⅓ G and ⅔ G). When found, the member node selected as the Slave PNC with the relative balanced number of nodes is going to be picked to be handed over the Primary PNC functionality and to assume the Primary PNC function and will, therefore, download such functionality along with the topological and rigid body structure information; and (3) if no Slave PNC selected by the Primary PNC can find more than ⅓ G new nodes:

the Primary PNC will choose, in Step 1500, the one searched-out node having the highest number of new nodes as the "most eligible" node to handover and download the Primary PNC function.

After Primary PNC functions are downloaded to a Slave PNC, the Slave PNC node should be in a coverage area of another piconet somewhere between R/2 and R. In FIG. 1, the node 60 fits these characteristics and is, therefore, selected for the example. The node 60 can also be defined as a border node after unloading its Primary PNC function to another new Slave PNC because it is located in an overlap region between the piconet 10 and the piconet 20. Once the necessary transition procedure is completed, the Primary PNC 12 relinquishes its PNC role to the node 60.

Because the handover of the PNC functionality is a sequential procedure, the current Primary PNC has no knowledge of any other piconet except its child piconet and previous piconets. The node 60 was chosen as the new primary piconet because it is at the boundary of the biggest rigid body discovered in the piconet 10.

The node 12 relinquishes its PNC functions by handing them over to the node 60. The second piconet 20 forms with the new Primary PNC being the node 60. When the Slave PNC 60 becomes the Primary PNC 60, then, in Step 1600, this new Primary PNC 60 forms a new piconet that includes all new members outside the range of the original PNC 12 but within the range of the new Primary PNC 60 along with all other members in the range R of the new Primary PNC 60, which may include existing members of the previous piconet 10. Specifically, the node 12 becomes a member node of the piconet 20. New Primary PNCs are determined sequentially. For example, the next Primary PNC can be the node 80 in the third piconet 30 of FIG. 1. Because the transfer of primary PNC functions is a random hop, it is possible that they are returned to the node 12 (from the nodes 60 or 80, for example) such that a more global rigid body, as well as more global topological view, is obtained and saved on the node 12.

The process for finding Slave PNCs and handing over from a Primary PNC to a Slave PNC is repeated and the entire coverage area is traversed.

Depending upon the availability of reference nodes to make the rigid body locatable, this process will be repeated for each rigid body in the network.

It is significant to note that the new Primary PNC will have all of the topological information obtained at the previous Primary PNC because all ranging information and identifications will have already been transferred from a previous Primary PNC(s). The new structure of the rigid body, as well as the topological information, is, therefore, added to include the structure of the new piconet. It is assumed that the topological information along with the rigid body structures are part of the data to be downloaded from the original or immediately preceding Primary PNC to the new Primary PNC.

The process is repeated from PNC to PNC with the PNC role being handed over to a node on the boundary of the combined rigid body. If the Primary PNC role is returned back to the original or a previous Primary PNC, a more global view of the topology will be seen by the original/previous Primary PNC because additional topological information and further rigid body structure will have been collected by the intervening PNC(s).

The handover process of the present invention can be described as a constraint random walk. When the boundary of the coverage area is approaching, the walk is turned to a different direction until all or most of the nodes are covered. When no new nodes are available to be recruited, the algorithm stops.

It should be noticed that the initial seed of the rigid body was defined to be a triangle within an R/2 circle. The seed exists with a high probability if the network degree is larger than 8. In fact, for a sparse network with less network degree, a triangle exists even if there are only two member nodes along with the PNC. Simply put, if a piconet forms with more than two members that have communication links therebetween, the triangle is able to form with the PNC and two of the arbitrary nodes. Therefore, the discovery of a rigid body described herein may not be limited by the condition of a large network degree.

Based upon the above algorithm, peer-to-peer ranging in a scatternet is enabled and at the same time, a rigid body can be discovered in a sequential manner such that the relative coordinates or absolute coordinates of unknown nodes can be determined dependent upon the availability of reference nodes. The rigid body discovery becomes part of the topology discovery procedure in the scatternet that was originally intended for building hierarchical networks. Implementation of the selection logic to download Primary PNC functions enables the procedure of rigid body discovery to be extended beyond a single piconet and into the scatternet topology. Therefore, the location determination problem in a densely deployed wireless sensor network constrained by IEEE 802.15.3 and 802.15.4 can be solved with much higher efficiency while reducing a great deal of computing complexity.

The algorithm of the present invention can be slightly amended to include a built-in fault tolerance feature to allow the search procedure to resume automatically when the entire procedure fails, whether or not it is immediately after an attempted handover. The additional procedure can require every subsequent Primary PNC—after the first Primary PNC—to update the immediately preceding Primary PNC before, during, or after the current Primary PNC hands over its Primary PNC functionality to the next Primary PNC. Simply put, if the procedure/system experiences a fault or a crash, then, the formation of the expanding scatternet is still preserved because at least the current Primary PNC and the immediately preceding Primary PNC have, stored therein, the last step of the scatternet, including the current rigid body and the existing topology maps. Thus, upon restart, the expansion of the scatternet can continue from the previous Primary PNC or the current PNC (assuming the handover had not been completed) without any significant repetition because either or both PNCs will have an identical copy of the topology and rigid body discovered up to that point.

Figure 4:
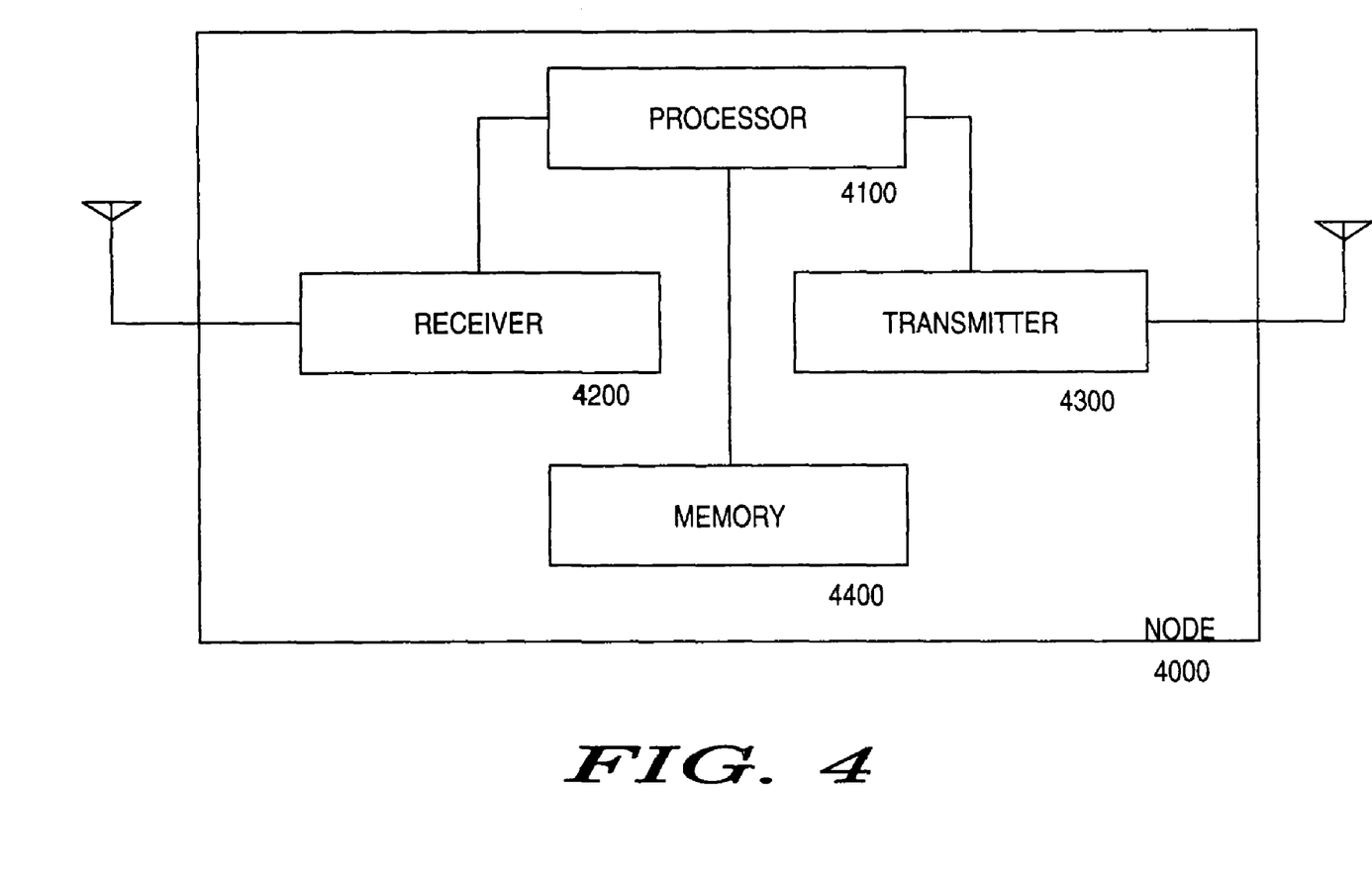
FIG. 4 is a block circuit diagram of a node according to the invention.

In the embodiments of the method described above, nodes of a communications network are mentioned. FIG. 4 is a block circuit diagram of a node 4000 that can carry out the processes according to the invention, regardless of the nature of the network, but, preferably, for a scatternet. Each node 4000 has a processor 4100 for processing communications, a receiver 4200 for receiving communications, and a transmitter 4300 for transmitting communications. Of course, the receiver 4200 and the transmitter 4300 can be combined into a non-illustrated transceiver unit 4200/4300. To hold the ranging information, the node member identifications, topological information regarding the scatternet, and information regarding structure of the rigid bodies, each node can also have a memory 4400. The memory 4400 is not limited to holding such data and can be used for any needed storage operation of the processor 4100.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

We claim:

1. A method for peer-to-peer ranging and discovery of a rigid body existing in a scatternet having piconets and nodes, which comprises:
    defining a node in a piconet to be a piconet controller having controller functions;
    locating a rigid body seed including the node;
    discovering a rigid body by sequentially downloading controller functions of the piconet controller to at least one border node; and
    providing the nodes with an average network degree of at least 8.

2. The method according to claim 1, which further comprises randomly deploying nodes in each piconet of the scatternet at a constant density having an average network degree at least high enough to form the rigid body seed in each of the piconets.

3. The method according to claim 1, which further comprises:
    providing the scatternet with a boundary defining a coverage area; and
    arbitrarily selecting the node in the scatternet to be one hop away from the boundary.

4. The method according to claim 3, which further comprises broadcasting a command from the piconet controller to all nodes in the respective piconet of the piconet controller to execute a range measurement with respect to the piconet controller and among all reachable peer member nodes.

5. The method according to claim 4, which further comprises:
    assigning each node of the scatternet a unique identification;
    executing range measurements by and among the nodes and the piconet controller in the respective piconet; and
    reporting ranging information along with a respective node identification to the piconet controller and storing the ranging information and the respective identifications in the piconet controller.

6. The method according to claim 5, which further comprises carrying out the rigid body seed location step by:
    determining with the piconet controller a smallest rigid body seed located within an area of the piconet dependent upon the ranging information obtained by the piconet controller; and
    subsequently determining possible rigid bodies in the scatternet.

7. The method according to claim 6, which further comprises defining the area to have a radius equal to half of a communications range of the piconet controller.

8. The method according to claim 6, which further comprises, for each rigid body discovered:
    determining if the rigid body is anchored by available reference nodes and:
        if reference nodes anchor the rigid body, calculating an absolute location for each node of the anchored rigid body; and
        if reference nodes do not anchor the rigid body, determining if the non-anchored rigid body can be partially anchored and:
            if the non-anchored rigid body can be partially anchored, adjusting local coordinates for the partially anchored rigid body to reflect partial global coordinates; and
            if the non-anchored rigid body cannot be partially anchored, setting up local coordinates for the non-anchored rigid body.

9. The method according to claim 8, which further comprises:
    selecting, with the piconet controller, an arbitrary node on a boundary of a largest rigid body of the rigid bodies to be a slave piconet controller;
    searching out, with the slave piconet controller, new node members of a piconet of the slave piconet controller and determining the number of new node members found by the slave piconet controller;
    comparing the number of new node members found by the slave piconet controller with a value of an average network degree of the scatternet; and:
        if a number of new node members found by the slave piconet controller is at least approximately one-third of the average network degree:
            selecting the slave piconet controller as a new piconet controller to be handed over the controller functions;
            handing over the controller functions from the piconet controller to the slave piconet controller; and
            forming a new piconet with the new piconet controller including all new node members outside the range of the piconet controller and within the range of the new piconet controller along with all other node members in the range of the new piconet controller; and
        if the number of new node members found by the slave piconet controller is up to two:
            permitting the slave piconet controller only to collect the ranging information from the new node members and among the new node members;
            maintaining the controller functions with the piconet controller;
            if another arbitrary node exists on the boundary of the largest rigid body to be a slave piconet controller, repeating the selecting, searching, determining, comparing, selecting, handing, forming, permitting, and maintaining steps; and if another arbitrary node does not exist on the boundary of the largest rigid body to be a slave piconet controller and if no slave piconet controller selected by the piconet controller can find more than one-third of the average network degree of new node members:
  selecting an already examined arbitrary node having a highest number of new node members as the new piconet controller to be handed over the controller functions;
  handing over the controller functions from the piconet controller to the new piconet controller; and
  forming a new piconet with the new piconet controller including all new members outside the range of the original piconet controller and within the range of the new piconet controller along with all other node members in the range of the new piconet controller.

10. The method according to claim 9, which further comprises repeating the selecting, searching, determining, comparing, selecting, handing, forming, permitting, maintaining, selecting, handing over, and forming steps for each rigid body.

11. The method according to claim 9, which further comprises carrying out the handing over step by downloading into a memory of the slave piconet controller at least the controller functions, the ranging information, and the identifications.

12. The method according to claim 9, which farther comprises repeating the step of handing over the controller functions from the piconet controller to a new piconet controller until the entire coverage area of the scatternet is traversed.

13. The method according to claim 10, which farther comprises repeating the step of handing over the controller functions from the piconet controller to a new piconet controller until the entire coverage area of the scatternet is traversed.

14. The method according to claim 9, which further comprises carrying out the handing over of the controller functions step by storing the ranging information, the identifications, topological information regarding the scatternet, and information regarding structure of at least one of the rigid bodies.

15. The method according to claim 9, which further comprises storing the ranging information, the identifications, topological information regarding the scatternet, and information regarding structure of at least one of the rigid bodies in the new piconet controller and in a piconet controller immediately preceding the new piconet controller one of:
  before carrying out the handing over of the controller functions step;
  while carrying out the handing over of the controller functions step; and
  immediately after carrying out the handing over of the controller functions step.

16. The method according to claim 9, which further comprises providing fault tolerance by storing the ranging information, the identifications, topological information regarding the scatternet and information regarding structure oft lest one of the rigid bodies in the new piconet controller and in a piconet controller immediately preceding the new piconet controller one of:
  before carrying out the handing over of the controller functions step;
  while carrying out the handing over of the controller functions step; and
  immediately after carrying out the handing over of the controller functions step.

17. In a scatternet of communications nodes defining piconets, a communications node, comprising:
  a receiver for receiving communications from other communications nodes in a communications range;
  a transmitter for sending communications to other communications nodes in said communications range;
  a memory storing at least ranging information and a unique identification for describing the node; and
  a processor connected to said receiver, to said transmitter, and to said memory, said processor being programmed to:
    broadcast a command to all nodes in said communications range to execute range measurements with respect to said processor and among all nodes in said communications range;
    execute range measurements with at least some of the nodes in said communications range and store said range measurements along with respective node identifications as at least a portion of the ranging information in said memory;
    transmit the ranging information to another node in said communications range;
    receive a handing over of piconet controller functions from another node and to hand over said piconet controller functions to another node;
    carry out said piconet controller functions; and
    carry out slave piconet controller functions.

18. The communications node according to claim 17, wherein said piconet controller functions include:
  determining a smallest rigid body seed located within said communications range dependent upon at least some of the ranging information;
  determining possible rigid bodies within said communications range;
  for each rigid body discovered:
    determining if the rigid body is anchored by available reference nodes and:
      if reference nodes anchor the rigid body, calculating absolute locations for each node of the anchored rigid body and storing said absolute locations in said memory; and
      if reference nodes do not anchor the rigid body, determining if the non-anchored rigid body can be partially anchored and:
        if the non-anchored rigid body can be partially anchored, adjusting local coordinates for the partially anchored rigid body to reflect partial global coordinates and storing said adjusted local coordinates in said memory; and
        if the non-anchored rigid body cannot be partially anchored, setting up local coordinates for the non-anchored rigid body and storing said local coordinates in said memory;
  downloading into said memory at least said piconet controller functions, the ranging information, the identifications, topological information regarding the scatternet and information regarding structure of at least one of the rigid bodies including said absolute locations and said local coordinates;
  determining if an entire coverage area of the scatternet is traversed and terminating handover of said piconet controller functions when the entire coverage area of the scatternet is traversed; and selecting an arbitrary node on a boundary of a largest rigid body of the rigid bodies to be a slave piconet controller.

19. The communications node according to claim 18, wherein said processor is programmed to carry out slave piconet controller functions including:

searching out, in said communications range, new node members of a piconet in which said processor is located;

determining a number of new node members found;

comparing the number of new node members found with a value of an average network degree of the scatternet; and:

if a number of new node members found is at least approximately one-third of the average network degree:

selecting the slave piconet controller having the number of new node members equal to at least approximately one-third of the average network degree to be a piconet controller to which said piconet controller functions are to be handed over and handing over said piconet controller functions to the selected slave piconet controller; and if the number of new node members found is up to two, only collecting the ranging information from the new node members and among the new node members;

if another arbitrary node does not exist on the boundary of the largest rigid body to be a slave piconet controller and if no slave piconet controller selected can find more than one-third of the average network degree of new node members, selecting an already examined arbitrary node having a highest number of new node members as a piconet controller to which said piconet controller functions are to be handed over and handing over said piconet controller functions to said already examined arbitrary node; and forming an expanded piconet including all of the new node members found outside a range of the node from which said piconet controller functions were handed over and within said range along with all other node members in said range.

20. The communications node according to claim 17, wherein said memory holds the node identifications, said piconet controller functions, said slave piconet controller functions, the ranging information, topological information regarding the scatternet, and information regarding structure of at least one of the rigid bodies including said absolute locations and said local coordinates.

* * * * *

UNITED STATES PATENT AND TRADEMARK OFFICE
CERTIFICATE OF CORRECTION

PATENT NO. : 7,362,724 B2
APPLICATION NO. : 10/616112
DATED : April 22, 2008
INVENTOR(S) : Jian Huang et al.

It is certified that error appears in the above-identified patent and that said Letters Patent is hereby corrected as shown below:

Column 1, line 5, after the title and before the heading "FIELD OF THE INVENTION" the following paragraph should be inserted:

STATEMENT REGARDING FEDERALLY
SPONSORED RESEARCH OR DEVELOPMENT

This invention was made with United States Government support under 70NANB2H3001 awarded by the National Institute of Standards and Technology (NIST). The United States Government has certain rights in the invention.

Signed and Sealed this

Thirteenth Day of January, 2009

JON W. DUDAS
*Director of the United States Patent and Trademark Office*